Figure 1:
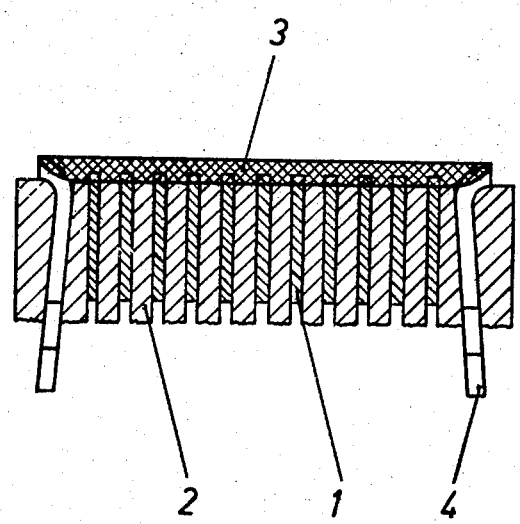

United States Patent
Kuhnen

[15] 3,699,641
[45] Oct. 24, 1972

[54] METHOD FOR MANUFACTURING LINER BODY FOR COMBUSTION CHAMBERS AND LINER PRODUCED BY THE METHOD

[72] Inventor: Gottfried Kuhnen, Nussbaumen, Switzerland

[73] Assignee: Aktiengesellschaft Brown, Boveri & Cie, Baden, Switzerland

[22] Filed: July 23, 1971

[21] Appl. No.: 165,401

Related U.S. Application Data

[63] Continuation of Ser. No. 820,270, April 29, 1969, abandoned.

[30] Foreign Application Priority Data

April 30, 1968 Switzerland..............6451/68

[52] U.S. Cl.............29/493, 29/471.1, 29/157.3 R, 165/181
[51] Int. Cl. ............................................B23k 5/22
[58] Field of Search........165/180; 263/42; 29/471.1, 29/471.3, 472.1, 493

[56] References Cited

UNITED STATES PATENTS

| | | |
|---|---|---|
| 1,510,146 | 9/1924 | Johnson..................29/493 X |
| 3,306,642 | 2/1967 | Arnold et al..............29/471.1 |
| 3,028,326 | 4/1962 | Brand et al. ................29/493 |

Primary Examiner—John J. Camby
Assistant Examiner—Theophil W. Streule
Attorney—Pierce, Scheffler & Parker

[57] ABSTRACT

A liner body for combination chambers comprises a cover plate made entirely of welding material deposited across the ends of and united with a plurality of parallel spaced cooling elements such as cooling fins. The cooling fins are held in proper parallel relation by a jig and the welding material is deposited across the end faces of the fins in one or more layers.

5 Claims, 2 Drawing Figures

PATENTED OCT 24 1972

3,699,641

Inventor

Gottfried Kuhnen

By Pierce, Scheffler & Parker
Attorneys

METHOD FOR MANUFACTURING LINER BODY FOR COMBUSTION CHAMBERS AND LINER PRODUCED BY THE METHOD

This is a continuation of Ser. No. 820,270 filed Apr. 29, 1969, now abandoned.

This invention relates to a method for the manufacture of a liner body for combustion chambers which has, at its side facing the combustion area, a cover plate and, at its reverse side, cooling elements, and it also relates to a liner body produced by this method.

Metallic combustion chambers consist essentially of two coaxial, cylindrical bodies, the inner one enclosing the combustion area while the outer one forms the pressure resistant jacket. To cool the inner jacket, a cooling medium, preferably air, is conducted through the annular gap between the two cylinders. The cooled, external surface of the inner jacket is advantageously so designed as to present a multiple of the inner surface radiated by the flames. This surface enlargement is accomplished, for instance, by means of bolts or ribs arranged in the flow direction of the coolant. So that the inner jacket can expand in all directions under the influence of heat, it often consists of single, identical components suspended from the support. Such components thus become readily exchangeable liner bodies for combustion chambers, various manufacturing methods for which are known, but which are also afflicted with various disadvantages; for example:

a. Cast liner bodies. Spacing and thickness of the cooling elements, especially when designed as cooling fins, become big when this method is used so that the surface enlargement of the side to be cooled is detracted from.

b. Extrusion, with suspension hooks welded on subsequently. Logically, the disadvantages are the same as those listed under (a). But add to this that only the same profile can be extruded, but no interruptions or bolts, for instance. Furthermore, the wear of the very expensive tools is great, and the required welding on of the hooks has not proven out well.

c. Milling from the solid, with subsequent welding on of the suspension hooks. Material expense and tool wear are too great for economical production. Disadvantage of the welded-on hooks as under (b).

d. Fusing a cover plate onto the cooling elements. It has turned out that the plate placed on top of the cooling elements does not fuse uniformly so that the cooling elements are not joined to the plate uniformly, particularly not cooling fins over their entire length. This impairs the heat conduction between the plate and the cooling elements.

SUMMARY OF THE INVENTION

The present invention is based on the task of producing economically, and avoiding the disadvantages inherent in the known methods, a liner body which, to the greatest possible extent, meets the conditions required for a good heat transfer on the cooled side and assures a reliable connection between the cooling elements of any shape and the cover plate. According to the invention, this problem is solved in that the cover plate, including one end of the cooling elements which are held in their correct position, is made completely of welding material.

Figure 2:
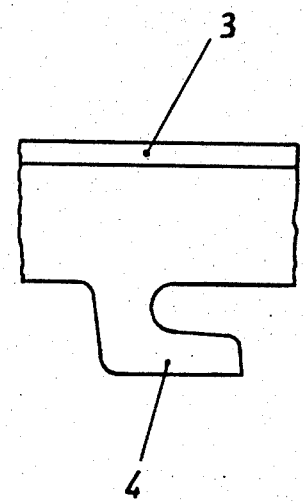

The drawing illustrates exemplarily a liner body made by the method according to the invention, FIG. 1 showing a cross-section of the body with a part of the holding device, and FIG. 2 a portion from the side view of the liner body.

The cooling fins 1 are inserted into the holding device 2, and their upper ends protrude into the cover plate 3. The two somewhat stronger, outer cooling fins are equipped with a suspension hook 4, and their upper ends are bent outward so that they form a part of the limiting edges of cover plate 3. These edges abut the adjacent liner bodies after assembly in the combustion chamber.

Another design possibility for the two outer cooling fins consists in leaving their upper ends parallel to the other cooling fins and bending them inward in S-shape so that they again form a limiting edge of the cover plate, their upper portion abutting, after assembly, the cooling fin, which is symmetrical thereto, of the adjacent liner body. For the rest, due to their S-shape, they leave a free space between each other for the coolant.

To produce the liner body, the cooling elements such as fins, ribs or bolts are inserted into the template-like holding device, thereby being fixed in their correct position already which they will assume later in the finished liner body. The cooling elements protrude out of the holding device only as much as will be included in the cover plate by the subsequent welding operation. This concludes the preparatory work, and the cover plate can be manufactured. This is done by build-up welding and the use of additional wire or additional strip, by laying one bead next to the other over the width of the liner body. In general, one welding layer suffices, but more of them can be put on top of each other, of course. It has proved to be expedient, when using cooling fins, to weld transversely across them because welding in longitudinal direction will reduce the strength of the finished body. If a second welding layer is applied, it may be put on in longitudinal direction. During the welding operation, the arc burns directly on the ends of the cooling elements protruding from the holding device, thereby effecting their complete connection with the welding material.

Using this manufacturing method, one is at liberty to select or combine the materials at will. Cooling elements and welding material may be of the same material, but it may also be advantageous to select a highly heat resistant material for the side facing of the combustion area, that is the welding material for the cover plate, and to use a material of good heat conductivity for the cooled side, that is for the cooling elements.

To prevent the surface of the holding device in contact with the cover plate from being welded also during the welding operation, it suffices to select for the holding device a material of good heat conductive properties, such as copper. In addition thereto, or also as a singular measure, the holding device may be cooled, too, for instance when the heat conductivity of the holding device is not or only slightly better than that of the cooling elements.

The method described is suited particularly for the economic production of greater numbers. In comparison to the above mentioned previously known production methods, costs are reduced considerably, and no particular demands are made on the operating personnel of the welding equipment. A good connection between cover plate and cooling elements and, hence, a reliable dissipation of the heat from the cover plate is assured, and the supersonic inspection, hitherto required over each individual cooling element, is obviated.

I claim:

1. A method for manufacturing liner bodies for combustion furnaces, said liner bodies having cooling elements on the outer surface thereof comprising placing a plurality of cooling elements in spaced parallel relation in a template-like holding device, said holding device positioning said cooling elements in the same relative position as in the finished liner bodies, portions of adjacent edges of the cooling elements extending beyond the edge of the holding device, depositing at least one layer of welding material transversely to the portions of the cooling elements which extend beyond the holding device and applying same in such an amount as to surround and cover the extended portions of the cooling elements and effect fusion of the welding material to the extended portions of the cooling elements to integrally unite the welding material to the extended portions and also form a cover surface of welding material on the inner surface of the liner body and finally removing the liner body from the holding device.

2. A method as claimed in claim 1 wherein the cooling elements are composed of the same welding material as is applied to the portions of the cooling elements extending beyond the holding device.

3. A method as claimed in claim 1 wherein the cooling elements are composed of a material having good heat conductivity and wherein the welding material applied to the portions of the cooling elements extending beyond the holding device is a high heat resistant welding material.

4. A method as claimed in claim 1 and further comprising applying a second layer of welding material onto the transverse layer thereof in a direction longitudinal of said cooling elements.

5. A method as claimed in claim 1 and further comprising cooling the holding device during the application of the welding material.

* * * * *